(12) United States Patent
Ueda et al.

(10) Patent No.: US 7,434,879 B2
(45) Date of Patent: Oct. 14, 2008

(54) STRUCTURE FOR ATTACHING SPRING

(75) Inventors: Nobuyuki Ueda, Osaka (JP); Toshiyuki Horiki, Nagano (JP); Takeru Tonouchi, Nagano (JP)

(73) Assignee: Kokuyo Furniture Co., Ltd., Osaka (JP)

( * ) Notice: Subject to any disclaimer, the term of this patent is extended or adjusted under 35 U.S.C. 154(b) by 20 days.

(21) Appl. No.: 11/594,836

(22) Filed: Nov. 9, 2006

(65) Prior Publication Data
US 2007/0108818 A1 May 17, 2007

(30) Foreign Application Priority Data
Nov. 11, 2005 (JP) .............................. 2005-328169

(51) Int. Cl.
A47C 3/025 (2006.01)
A47C 3/026 (2006.01)
A47C 3/021 (2006.01)

(52) U.S. Cl. ................................. 297/296; 297/354.11
(58) Field of Classification Search ................ 297/296, 297/354.11
See application file for complete search history.

(56) References Cited

U.S. PATENT DOCUMENTS

| | | | | |
|---|---|---|---|---|
| 4,709,963 | A * | 12/1987 | Uecker et al. | 297/354.11 X |
| 4,834,453 | A * | 5/1989 | Makiol | 297/354.11 X |
| 5,249,839 | A * | 10/1993 | Faiks et al. | 297/300.1 |
| 5,385,388 | A * | 1/1995 | Faiks et al. | 297/301.3 |
| 5,951,109 | A | 9/1999 | Roslund, Jr. et al. | |
| 6,189,971 | B1 * | 2/2001 | Witzig | 297/284.1 X |
| 6,220,661 | B1 * | 4/2001 | Peterson | 297/218.4 |
| 6,257,665 | B1 * | 7/2001 | Nagamitsu et al. | 297/285 |
| 6,439,661 | B1 * | 8/2002 | Brauning | 297/300.2 |
| 6,523,898 | B1 * | 2/2003 | Ball et al. | 297/320 |
| 6,565,153 | B2 * | 5/2003 | Hensel et al. | 297/285 |
| 6,572,190 | B2 * | 6/2003 | Koepke et al. | 297/284.1 |
| 6,672,669 | B2 * | 1/2004 | Chu et al. | 297/301.1 X |
| 6,695,403 | B1 * | 2/2004 | Su | 297/284.7 |

(Continued)

FOREIGN PATENT DOCUMENTS

EP 0 259 609 A2 3/1988

(Continued)

OTHER PUBLICATIONS

European Search Report dated Jan. 30, 2007 issued in corresponding European Application No. 06 12 3875.

*Primary Examiner*—Rodney B. White
(74) *Attorney, Agent, or Firm*—Westerman, Hattori, Daniels & Adrian, LLP.

(57) ABSTRACT

A structure for attaching a frame-like spring being capable of effectively reducing the number of parts, is provided. According to this structure, a reaction force frame element which is a frame-like spring is attached via a lower frame portion and an upper frame portion so that pressurization is always provided in the movable range and the pressurization becomes the lowest at a predetermined position of a normal posture. Specifically, when the a reaction force frame element is made into the attaching preparation posture that the elastic repulsive forces are accumulated rather than a normal posture, the upper attaching portions include insertion portions for allowing insertion of lower ends and engagement portions to be engaged to the lower end portions due to an elastic repulsive force when the external force is released.

9 Claims, 17 Drawing Sheets

U.S. PATENT DOCUMENTS

| | | | |
|---|---|---|---|
| 6,761,406 B2 * | 7/2004 | Kinoshita et al. | 297/296 |
| 6,991,291 B2 * | 1/2006 | Knoblock et al. | 297/284.4 |
| 7,014,269 B2 * | 3/2006 | Coffield et al. | 297/452.56 |
| 7,066,537 B2 * | 6/2006 | Coffield et al. | 297/284.4 |
| 7,226,127 B1 * | 6/2007 | Yevko et al. | 297/296 X |
| 7,273,253 B2 * | 9/2007 | Deimen et al. | 297/300.4 |
| 2002/0190555 A1 | 12/2002 | Holbrook et al. | |
| 2004/0012237 A1 | 1/2004 | Horiki et al. | |
| 2008/0030059 A1 * | 2/2008 | Deimen et al. | 297/354.11 |

FOREIGN PATENT DOCUMENTS

| | | |
|---|---|---|
| JP | 2002-119373 A | 4/2002 |
| WO | WO 00/22961 A1 | 4/2000 |

* cited by examiner

STRUCTURE FOR ATTACHING SPRING

BACKGROUND OF THE INVENTION

1. Field of the Invention

The present invention relates to a structure for attaching a spring to be attached to two rotatable members.

2. Description of the Related Art

Conventionally, various structures such as a backrest of a chair have been suggested, which elastically urge two members supported rotatably in a predetermined direction. Among such structures, in the case of a chair that an elastic member is provided between a seat of the chair and a backrest rotatably supported against the seat, an aspect of elastically urging a backrest frame forward by a spring such as a gas spring upon the rocking operation to incline the backrest backward has been known.

Patent Document 1: Japanese Patent Application Laid-Open No. 2002-119373

On the other hand, an aspect may be considered, in which, by attaching a frame-like spring to two members rotatably attached, these members are elastically urged due to an elastic repulsion of the spring.

However, in order to attach a resin spring to two members, particular mechanical parts are required, the mechanical parts being for attaching the resin spring accurately and securely to a predetermined position in the opposite ends of the spring and an attaching part disposed to each two members for attaching the members to these opposite ends of the spring. Then, when attaching these particular mechanical parts to the members, many mechanical parts should be put on the attaching parts and the opposite ends of the spring and this increases the total number of the parts.

SUMMARY OF THE INVENTION

The present invention has been made taking the foregoing problems into consideration and an object of which is to provide a structure for attaching a spring capable of effectively reducing the number of the parts.

In order to attain the above-described object, according to the present invention, there is provided the following means. Namely, the present invention may provide a structure for attaching a spring that a second member is provided to a first member so as to be able to rotate in a predetermined movable range, and the opposite ends of a frame-like spring are attached via respective attaching portions, so that a pressurization is always given in the movable range and the pressurization becomes the lowest at a predetermined position; wherein, at least one attaching portion comprises an insertion portion for allowing insertion of the end of the frame-like spring when the frame-like spring is made into the attaching preparation posture that the elastic repulsive forces are accumulated rather than a normal posture at the predetermined position due to an external force, and an engagement portion to be engaged to the end by an elastic repulsive force when the external force is released.

Here, it is defined that the term of "frame-like" means the aspect to be disposed along the frame which is the object of attaching or be elongated along this frame. Then, "the frame-like spring" may be made by molding the resin spring in a frame shape or carving out a spring steel plate into a frame shape. In addition, it is obvious that the spring steel plate resin coated with resin is also available.

In such an attachment structure, the ends of the spring can be supported at the attaching portion by the elastic urge force so as to be incapable of falling, so that it is possible to keep the attaching position of the resin spring without requiring particular members for keeping the position of the end. Thereby, the number of parts for attaching the spring can be effectively reduced.

It is preferable that a spring is provided between the lower frame portion which is the first member and the upper frame which is the second member, in order to configure compactly a chair by effectively reducing the number of parts at the upper portion of the backrest of the chair having highly visible mechanical parts by applying this structure for attaching the spring, it is preferable that a spring is provided between the lower frame, which is a first member, and the upper frame, which is a second member, in the chair having a lower frame portion of a backrest which is supported to a base supported by a leg so as to be able to be rocked thereto and an upper frame portion of the backrest which is supported to the lower frame portion so as to be able to be rocked thereto.

Further, by providing the spring between the lower frame portion and a pair of upper frame element, respectively, in the structure for attaching the spring in the chair having an upper frame portion comprises a pair of upper frame elements which are arranged right and left and are independently supported to the lower frame portion, respectively, so as to be able to be rocked thereto, it is possible to elastically urge the pair of right and left upper frame elements independently.

On the other hand, assuming that the spring is put between the base as the first member and the upper frame portion as the second member in the chair configured as above-described, the configuration such that the elastic urge force against the upper frame portion as the lower frame portion is inclined backward can be obtained, and the upper half of the body of a user who is inclined backward by the lower frame portion can be stably supported by the upper frame portion.

In addition, it is obvious that the present structure for attaching the spring may be applied to a back frame without the above-described upper frame portion and lower frame portion. In other words, it is possible to preferably perform rocking of the backrest by applying the resin spring of a frame-like shape by providing the spring between the base which is the first member and the back frame which is the second member in the chair having a base supported by a leg and a backrest frame which is supported to the base so as to be able to be rocked thereto.

According to the present invention, the attaching position of the frame-like spring can be kept without the need for particular members. Thereby, it is possible to effectively reduce the number of the parts for attaching the frame-like spring.

DESCRIPTION OF THE PREFERRED EMBODIMENTS

Figure 1:
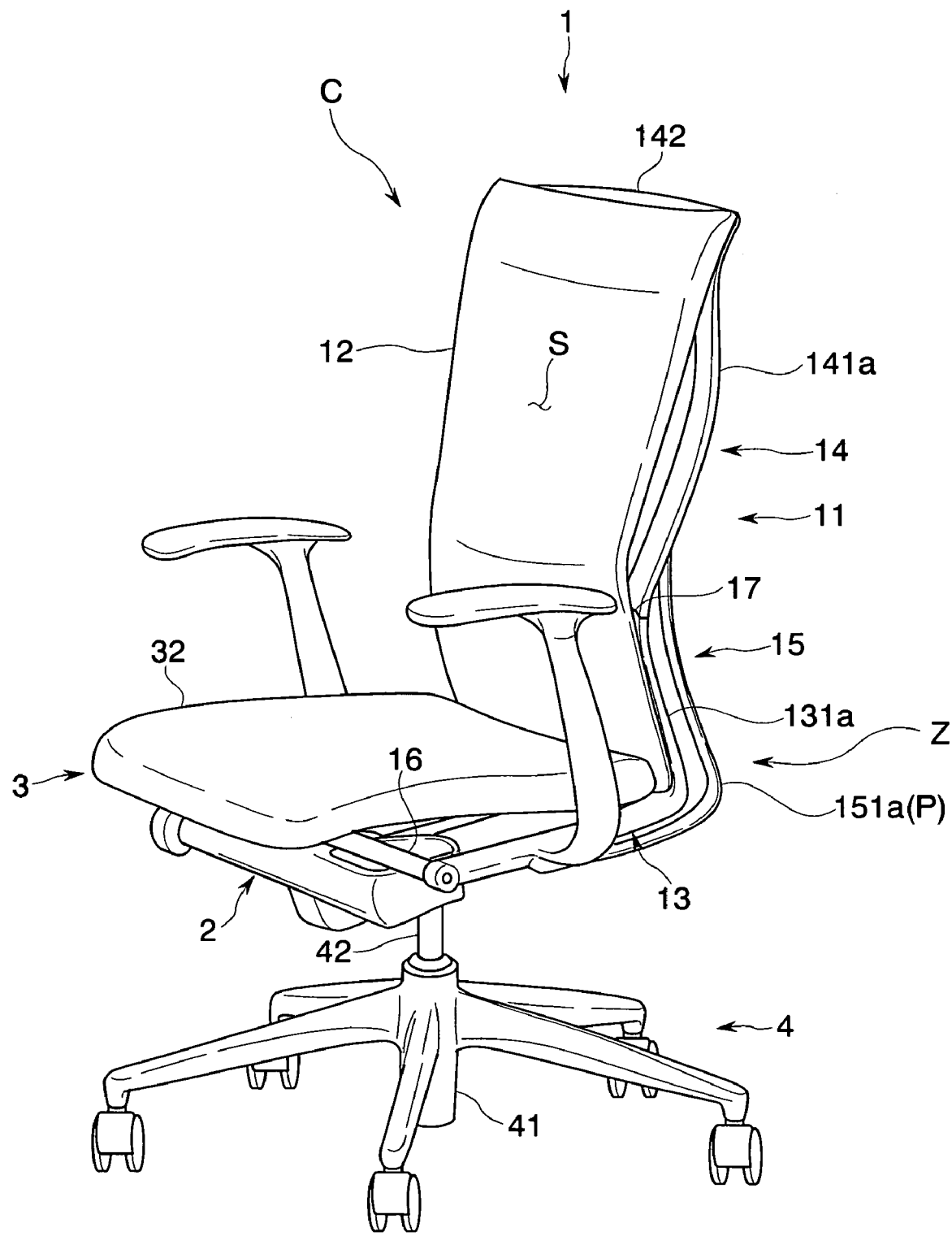
FIG. 1 is a perspective view showing a chair of an embodiment according to the present invention as seen from the front side thereof.
Figure 2:
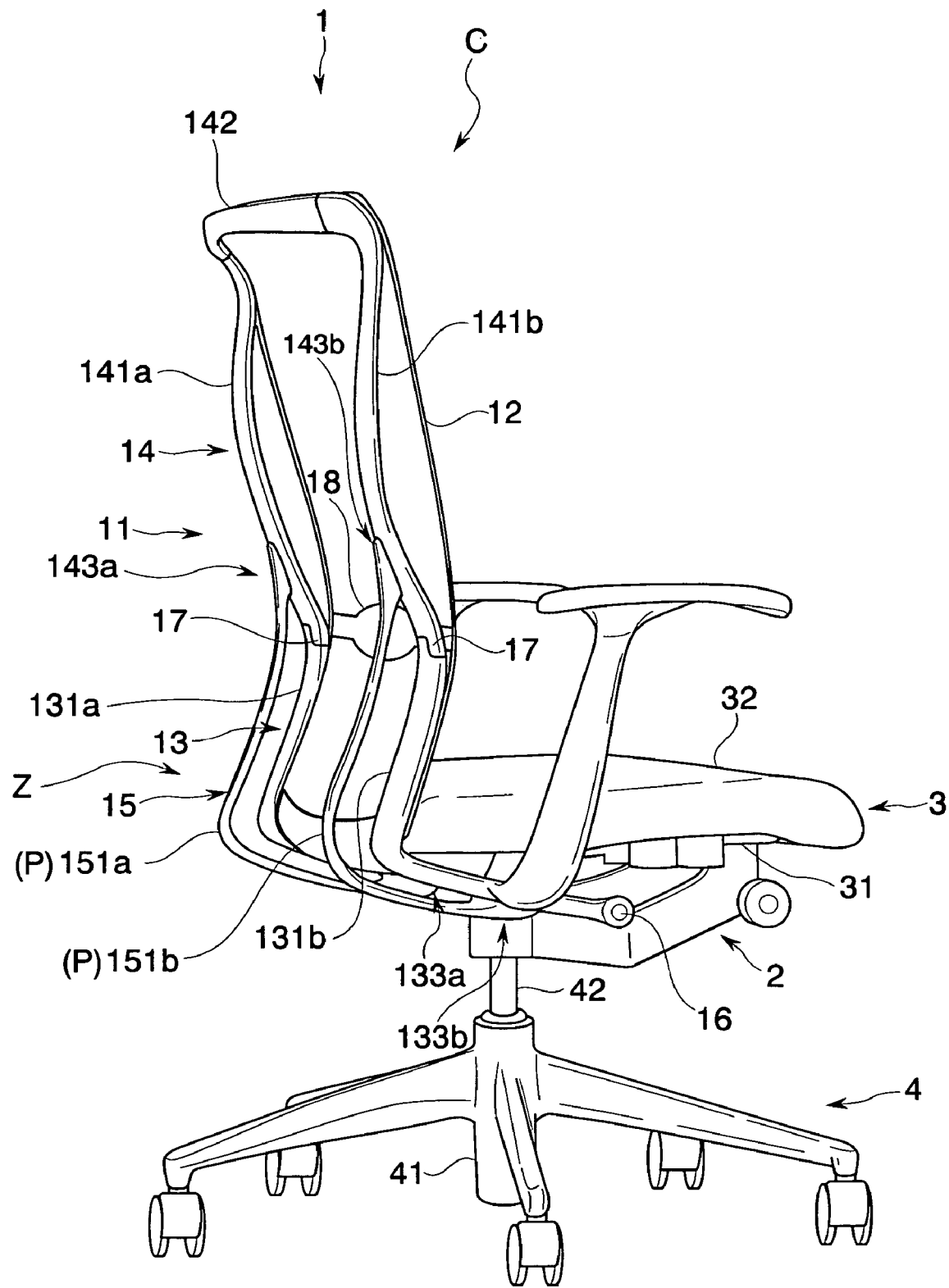
FIG. 2 is a perspective view showing the chair as seen from the rear side thereof.

An embodiment of the present invention will be described below with reference to the drawings.

As shown in FIGS. 1 to 5, a chair C according to the present embodiment may include a leg 4, a base 2 supported by the leg 4, a seat 3 arranged on the base 2, and a backrest 1 pivotally fitted to the base 2 via a horizontal support shaft 16, and the chair C according to the present embodiment can carry out the synchronous rocking operation that the seat 3 and the backrest 1 are inclined in conjunction with each other.

In this case, the present chair C may include the backrest 1, a lower frame portion 13 which is a first member to be described later, an upper frame portion 14 to be described later, and reaction force frame elements 151a and 151b which are frame-like spring configuring a reaction force frame portion 15 to support this upper frame portion 14 from behind. Then, an attachment structure Z of these reaction force frame elements 151a and 151b provided so as to be able to rotate the upper frame portion 14 as the second member for the lower frame portion 13 as the first member in a predetermined movable range, and lower ends 152a and 152b and upper ends 153a and 153b of the frame-like reaction force frame elements 151a and 151b are provided via lower attaching portions 133a and 133b and upper attaching portions 143a and 143b, respectively, so that a pressurization is always given to these lower ends 152a and 152b and upper ends 153a and 153b and the pressurization becomes the lowest at a predetermined position where the lower ends 152a and 152b take a normal posture (P). In addition, the attachment structure may include insertion portions 143a1 and 143b1 (to be described later) for allowing insertion of lower ends 152a and 152b (to be described later) of the reaction force frame elements 151a and 151b into the upper attaching portion 143a and 143b when the reaction force frame elements 151a and 151b are made into an attaching preparation posture (Q) accumulating the elastic repulsive force more than the normal posture (P) by the external force; and engagement portions 143a2 and 143b2 (to be described later) engaged to the lower ends 152a and 152b by the elastic repulsive force when the external force is released. However, such the attachment structure Z will be described in detail later.

Hereinafter, each constitutional element to configure the chair C will be specifically described.

The leg 4 is provided with a leg wing 41 mounting a plurality of casters thereon and a leg support pillar 42 rising approximately vertically from the center of the leg wing 41 so as to be able to move up and down the leg support pillar 42 due to expansion and contraction of a gas spring (not illustrated) installed between the leg wing 41 and the leg support 42. The base 2 is fixed to the upper end of the leg support pillar 42, and it is possible to adjust the height positions of the seat 3 and the backrest 1 through the moving up and down operation of the leg support pillar 42.

The seat 3 is configured so as to hold a cushion body 32 constituting a seat face on a seat receiver 31. The cushion body 32 is made as a double layered structure superimposing a urethane cushion material on a double Raschel mesh, for example, made of a synthetic fiber, the mesh at the lower layer secures an appropriate elasticity while absorbing the shock, and the urethane cushion material of the upper layer keeps a stability of a posture. The front end of the seat 3 is supported by the base 2 so as to slidably move in a back and front direction for the base 2, and the rear end of the seat 3 is attached to the lower frame portion 13 of the back frame 11 via a hinge (not illustrated).

The backrest 1 is made by attaching an upholstery member configuring the backrest face S on the front face of the back frame 11. The back frame 11 is provided with the lower frame portion 13 which is the first member turnably connected around the horizontal support shaft 16 with respect to the base 2, the upper frame portion 14 which is the second member-connected to the upper end of the lower frame portion 13 via the hinge 17, and the reaction force frame portion 15 to support this upper frame portion 14 from behind.

The lower frame portion 13 is made by mutually connecting the right and left upper elements 131a and 131b arranged separated in a width direction by a rigid lateral bridging member 132. The lower frame elements 131a, 131b, and the rigid lateral bridging member 132 are rigid bodies, for example, made of a metal. The lower frame elements 131a and 131b are elongated from the front end where the horizontal support shaft 16 is located to the rear portion and curved upward at the rear end to be made into approximately an L-shape as seen from the side. The lower frame elements 131a and 131b are provided with the lower attaching portions 133a and 133b for attaching the reaction force frame portion 15. These lower attaching portions 133a and 133b will be described later.

The upper frame portion 14 is made by mutually connecting the right and left upper frame elements 141a and 141b arranged separated in a width direction by an elastic lateral bridging member 142. The upper frame elements 141a and 141b are rigid bodies, for example, made of a metal; however, the elastic lateral bridging member 142 is an elastic body, for example, made of a resin. The upper frame elements 141a and 141b are slowly curved from the lower end where the hinge 17 is located and is elongated upward while getting dented backward in some degree so as to be made into an arch swelled forward again in the vicinity of its upper end as seen from the side. In addition, on the upper frame elements 141a and 141b, upper attaching portions 143a and 143b for attaching the reaction force frame portion 15 are disposed. These upper attaching portions 143a and 143b will be described later.

The reaction force frame portion 15 is made of reaction force frame elements 151a and 151b which are frame-like springs of the same number to support each of the upper frame elements 141a and 141b. Upper ends 153a and 153b, which are one ends of the reaction force frame elements 151a and 151b, are linked with the upper attaching portions 143a and 143b of the upper frame elements 141a and 141b, respectively; and lower ends 152a and 152b are linked with the lower attaching portions 133a and 133b mounted on the downward faces of the lower frame elements 131a and 131b, respectively. However, as being described later, the lower ends 152a and 152b are not prevented from being fixed on the seat 3 and the base 2 supporting the backrest 1. It is assumed that the reaction force frame elements 151a and 151b are made of an elastic body made of a resin of the same quality as, for example, the elastic lateral bridging member 142. According to the present embodiment, the reaction force frame elements 151a and 151b are frame-like springs made of a resin, which are elongated along the upper elements 131a and 131b and the upper frame elements 141a and 141b so as to be made into approximately a L-shape as seen from the side. These reaction force frame elements 151a and 151b are molded in such a manner that the width measurements are the same or slightly smaller than those of the frame elements 131a, 131b, 141a, and 141b and the thicknesses of the longitudinal portion and vertical portion thereof are thinner than those of the frame elements 131a, 131b, 141a, and 141b (in addition, they are becoming gradually thinner as being far from the end to be connected to the frame elements 131a, 131b, 141a, and 141b). Thereby, the appearance such that the reaction force frame elements 151a and 151b seem a part of the back frame 11 branched from the frame elements 131a, 131b, 141a, and 141b is formed. Further, under the state shown in FIG. 3 that the upper frame portion 14 is not moved backward, the reaction force frame portion 15 makes the normal posture (P). Then, under this normal state (P), the pressure given to the upper frame portion 14 from the reaction force frame elements 151a and 151b, namely, an elastic urge force becomes the smallest.

Figure 12:
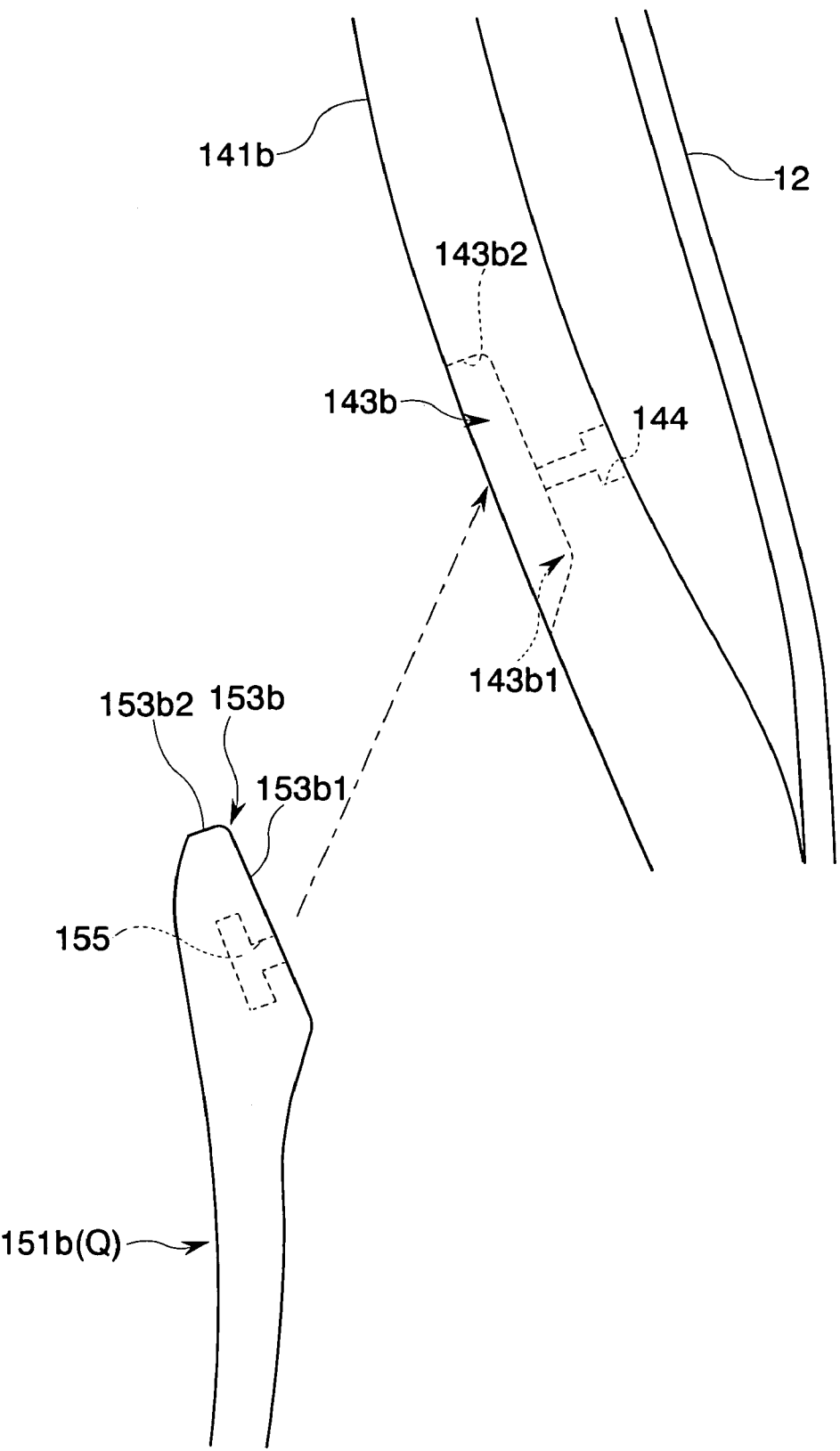
FIG. 12 is a substantial part explanatory view showing this attachment structure.
Figure 13:
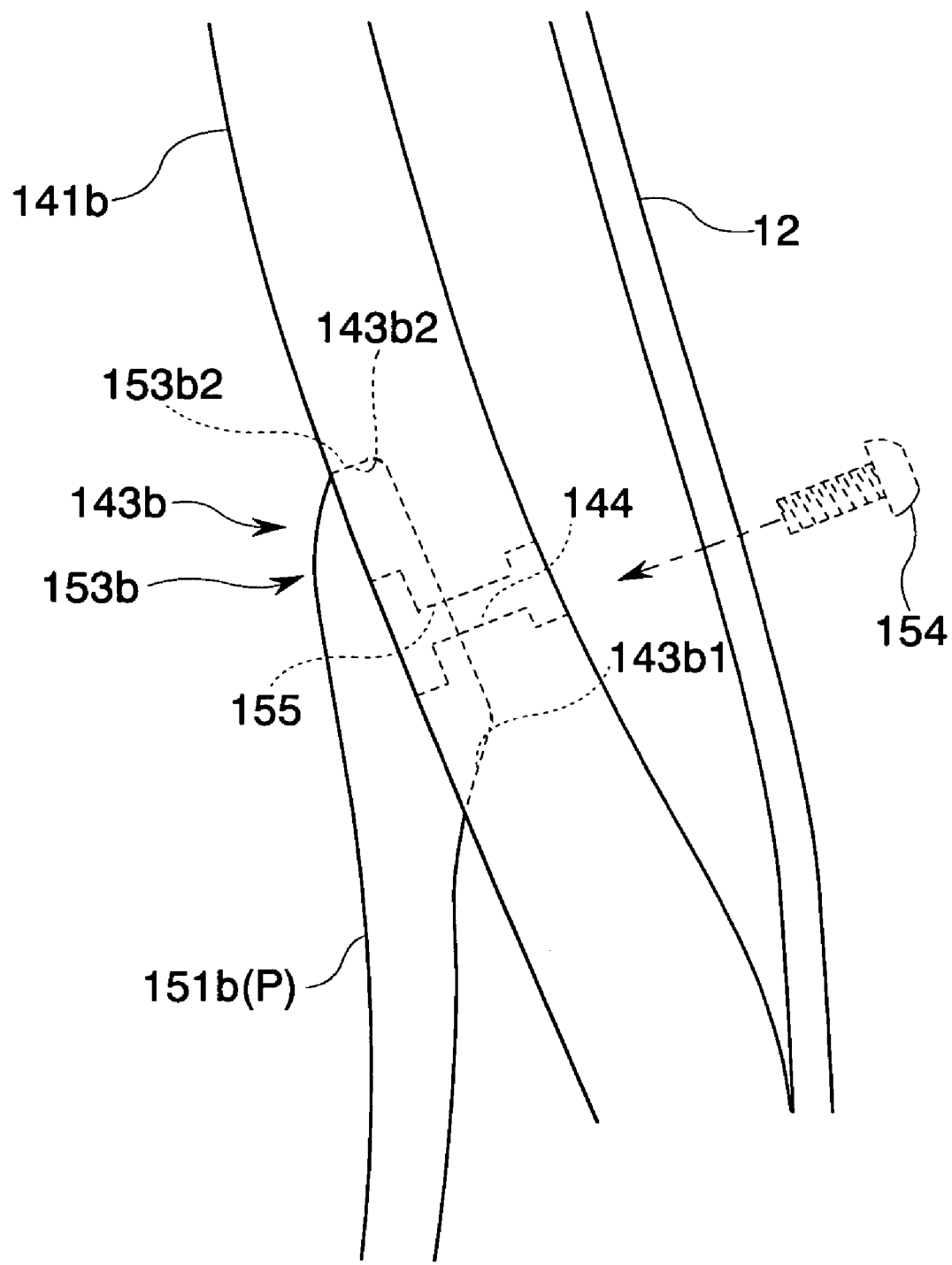
FIG. 13 is the substantial part explanatory view showing this attachment structure.

In addition, according to the present embodiment, the lower ends 152a and 152b and the upper ends 153a and 153b, which are the opposite ends of these reaction force frame elements 151a and 151b, are attached to the lower frame portion 14 and the upper frame portion 15 via the lower attaching portions 133a and 133b and the upper attaching portions 143a and 143b, respectively, by the attachment structure Z according to the present invention; however, the specific explanation for this attachment structure Z will be given later. In addition, as shown in FIG. 12 and FIG. 13, although a nut hole 155 for inserting one retaining screw 154 (a screw insertion hole 155 at the lower end 152b not illustrated) is provided to the upper end 153a and the lower end 152b, respectively, the retaining screw 154 and the nut hole 155 will be also described later.

In the periphery of the hinge 17 to pivotally fit the lower frame elements 131a and 131b and the upper frame elements 141a and 141b with each other, specifically, from the rear ends of the lower frame elements 131a and 131b to the vicinity of the upper ends thereof and in the range in the vicinity of the lower end of the upper frame elements 141a and 141b, a curved shape that the front face of the frame is swelled forward as seen from the side is formed. As described above, also in the vicinity of the upper ends of the upper frame elements 141a and 141b, a curved shape that the front face of the frame is swelled forward as seen from the side is formed. Thus, the upholstery member is tensed so as to be bridged to the above-described region formed in the curved shape of the lower frame elements 131a and 131b and the upper frame elements 141a and 141b.

The upholstery member is mainly made by a stretch upholstery fabric. The upholstery fabric is made by weaving an elastic thread such as an elastomer thread or the like in a double raschel mesh, for example, of a synthetic resin and this upholstery fabric has both of strength and a cushion capability. The upholstery fabric has different appearances (color, pattern, and brilliance or the like). The upper side and right and left sides of the upholstery fabric are kept by a backup material (not illustrated) formed in a three-way frame or a four-way frame as seen from the front. The backup material is a thin plate made of, for example, a resin, and particularly, this backup material prevents the right and left sides of the upholstery fabric from being flexed inside to keep the upholstery fabric into the tensed state. The upper end of the upholstery member is installed in the right and left upper frame elements 141a and 14b to be supported, and the lower end is installed in the right and left lower frame elements 131a and 131b to be supported. In this case, the backup material practices the action of a plate spring and presses the upholstery fabric to be swelled.

Further, it is also possible to bridge a lumber support belt 18 at the height position corresponding to the waist portion of a person who is seated on the chair at the back of the upholstery member. Even when the person who is seated on the chair leans against the backrest face S, the region where the lumber support belt 18 is bridged does not sink backward more than a depth corresponding to the length of the lumber support belt 18.

Figure 6:
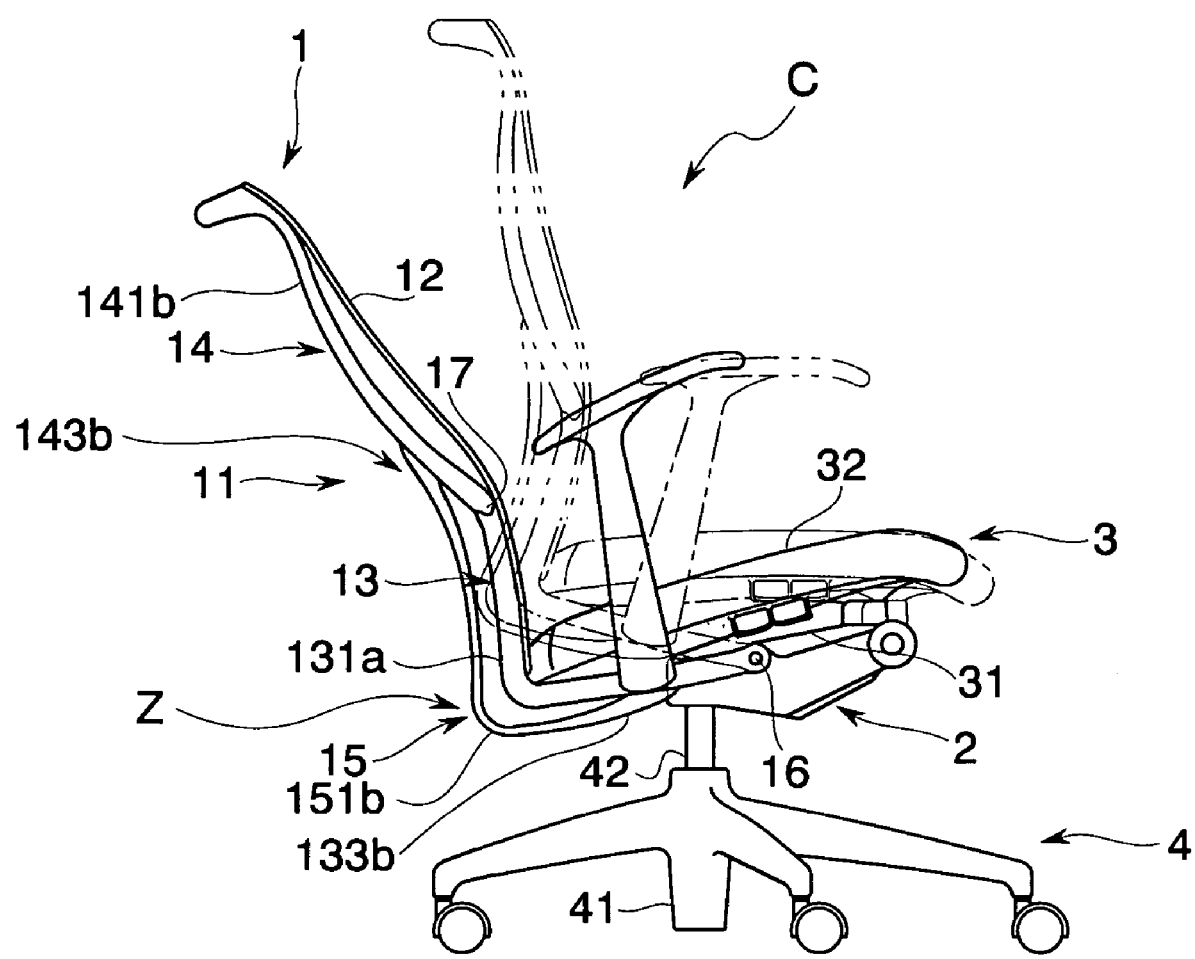
FIG. 6 is a side view showing the synchronous rocking operation of the chair.

The chair C according to the present embodiment can perform the synchronous rocking operation that the seat 3 and the backrest 1 are inclined in conjunction with each other. As shown in FIG. 6, according to the synchronous rocking operation, the backrest 1 is inclined forward and backward by entirely turning the back frame 11 around the horizontal support shaft 16. At the same time, the rear end of the seat 3 is swung upward and downward in conjunction with the back frame 11 and the front end of the seat 3 is slid backward and forward.

On that basis, in the chair C according to the present embodiment, the operation is possible to displace only the left half of the upper portion of the backrest face S backward or only the right half thereof backward following the movement that the person who is seated on the chair turns his or her head to look back in the seat, extends his or her arm, and twists his or her body. In the upper frame portion 14 supporting the upper portion of the backrest face S moves backward and forward, the upper frame elements 141a and 141b move independently each other, which are paired in right and left. In other words, the upper frame element 141a at the left side is connected to the lower frame element 131a at the left side via the hinge 17, and the upper frame element 141b at the right side is connected to the lower frame element 131b at the right side via the hinge 17. These upper frame elements 141a and 141b can turn individually.

Figure 7:
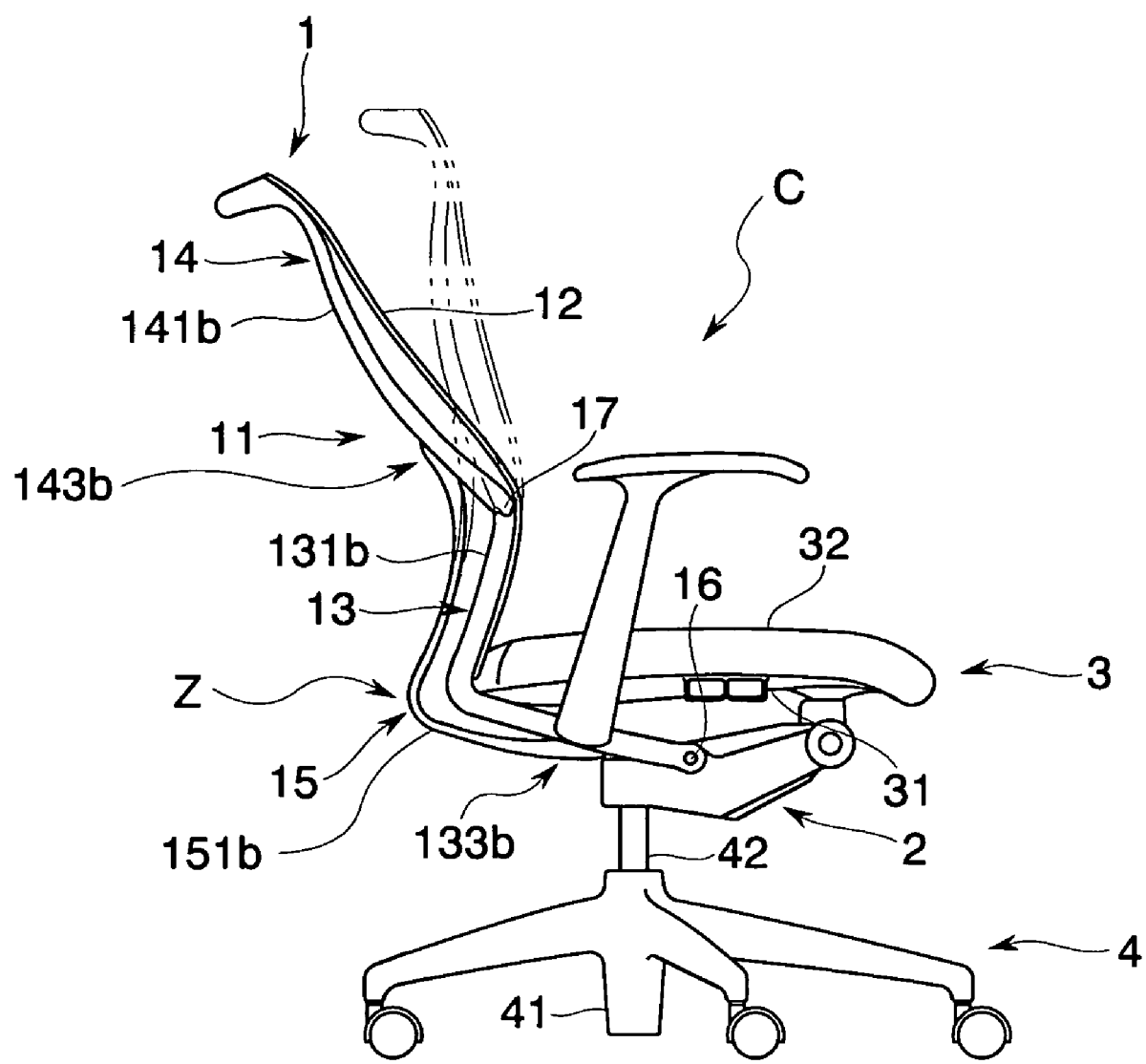
FIG. 7 is a side view showing the state that an upper frame element of the chair is displaced backward.

As shown in FIG. 7, when the upper frame elements 141a and 141b are inclined backward around the hinge 17, the area where the upholstery member contacts the region formed in the curved shapes of the lower frame elements 131a and 131b and the upper frame elements 141a and 141b gradually increased, and further, the upholstery fabric extends upward and downward while increasing an upholstery. In addition, the reaction force frame elements 151a and 151b are deformed to extend angles and accumulate the reaction forces therein. Then, the reaction force frame elements 151a and 151b elastically urge the upper frame elements 141a and 141b to the original positions, namely, a direction to return the reaction force frame elements 151a and 151b themselves to the normal position (P), namely, forward.

Figure 8:
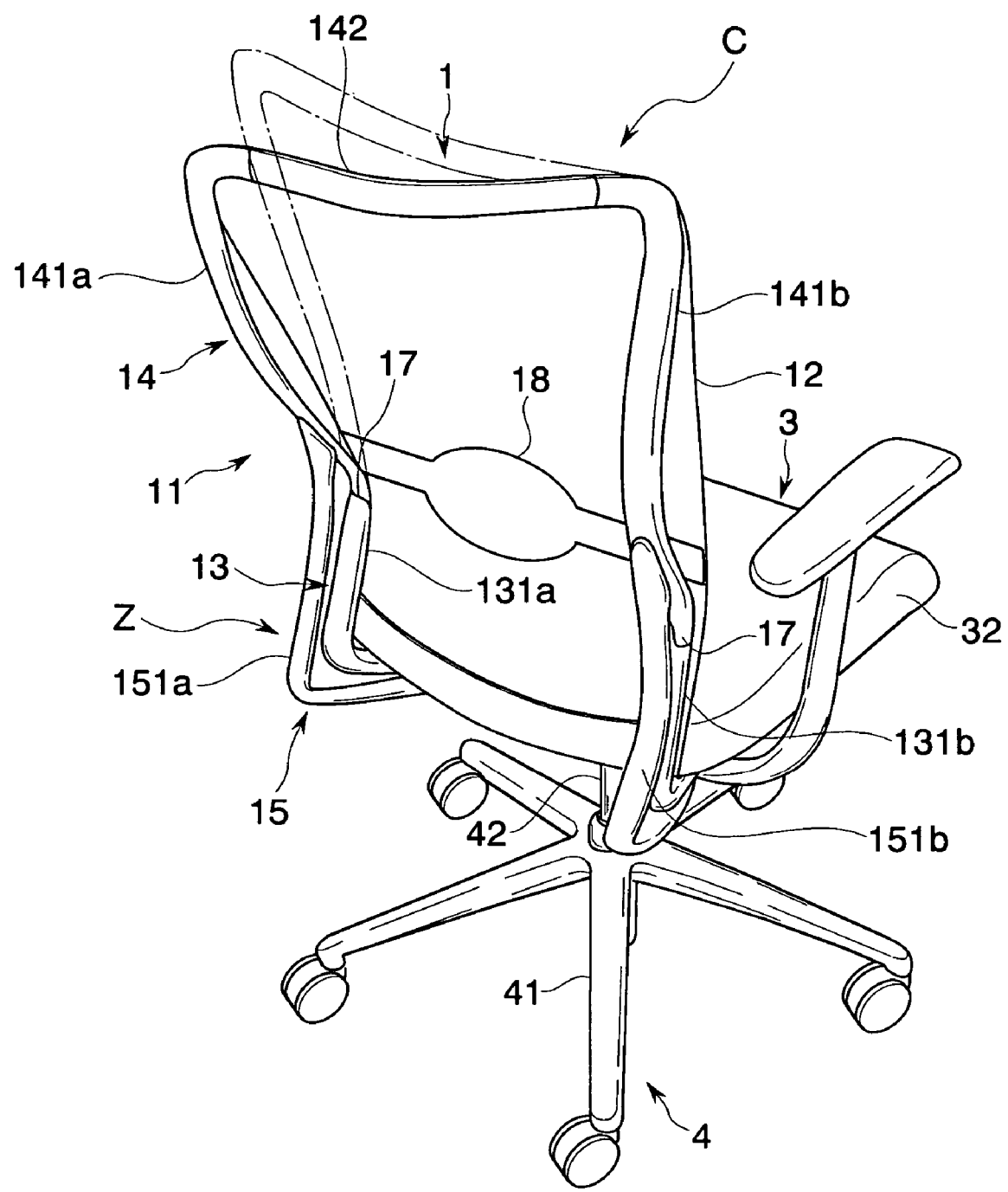
FIG. 8 is a perspective view showing the surface deformation operation of a backrest of the chair.
Figure 9:
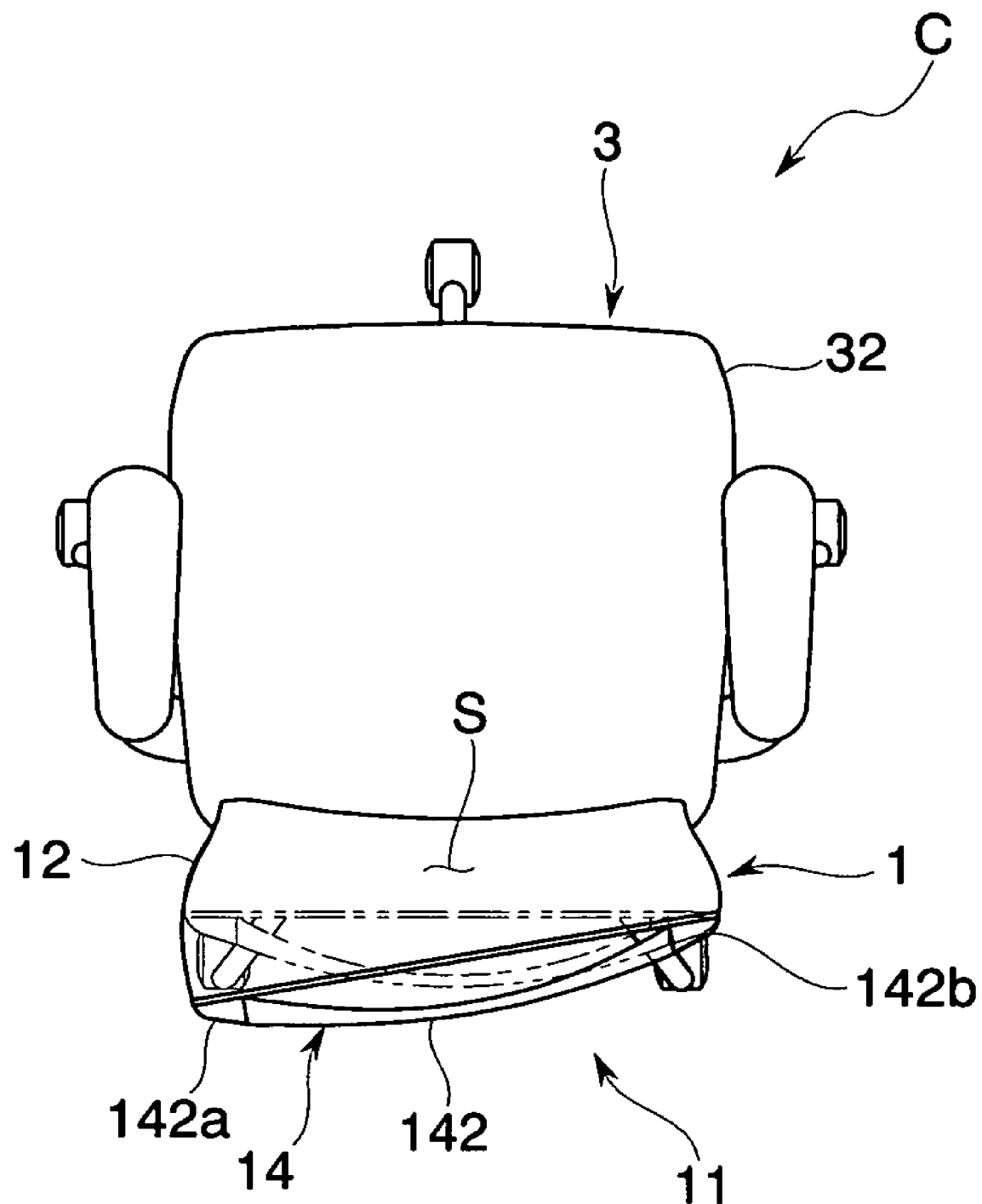
FIG. 9 is a plan view showing the surface deformation operation of a backrest of the chair.

Then, if any one of the upper frame elements 141a and 141b relatively displaced in a back and front direction for other one of the upper frame elements 141a and 141b, as shown in FIG. 8 and FIG. 9, it is possible to change the shape of the backrest face S three-dimensionally. In this operation, the lower frame portion 13 is not necessarily driven. In addition, since the lower frame elements 131a and 131b to be paired left and right are rigidly connected via the rigid lateral bridging member 132, these lower frame elements 131a and 131b constantly make a movement integrally. Therefore, the lower portion of the backrest face S, namely, the portion backward from the waist portion of the person who is seated on the chair constantly keeps a predetermined shape.

If one of the upper frame elements 141a and 141b relatively moves backward and forward to other one of them in accordance with the movement of the person who is seated on the chair, a distance between right and left upper frame elements 141a and 141b is increased. In this case, in order to correspond to increase of the distance between these frame elements 141a and 141b, the elastic lateral bridging member 142 is elastically deformed. The elastic lateral bridging member 142 of the present embodiment connects the upper ends of the frame elements 141a and 141b with each other to be assembled to make the curved shape getting dented backward as seen from the flat face. The thickness of the front and rear of the elastic lateral bridging member 142 is gradually thinner toward the center in the width direction thereof from the opposite ends thereof connected to the upper frame elements 141a and 141b, so that the center part is comparatively deformable than the opposite ends. This structure serves to prevent the load from getting centered on the place where the upper frame elements 141a and 141b are connected to the elastic lateral bridging member 142. When one of the upper frame elements 141a and 141b relatively moved backward and forward against other one of them, the elastic lateral bridging member 142 is deformed so as to decrease a curvature factor and extends the distance between the opposite ends.

In addition, the load of the person who is seated on the chair given to the backrest face S may act on the upper frame elements 141a and 141b via the upholstery member and may give the load on the hinge 17 so as to incline the upper frame elements 141a and 141b inward. In order to reduce such a load, the elastic lateral bridging member 142 is assembled so that it exercises the initial elasticity so as to separate the upper frame elements 141a and 141b in a width direction.

It is also possible to incline both of the upper frame elements 141a and 141b. In this case, for example, stretch to largely through his or her back becomes possible.

Here, according to the attachment structure Z of the frame-like spring according to the present embodiment, the opposite ends of the reaction frame portion 15, namely, the upper ends 153a and 153b and the lower ends 152a and 152b of the reaction force frame elements 151a and 151b are attached to the upper frame portion 15 and the lower frame portion 14 via the upper attaching portions 143a and 143b and the lower attaching portions 133a and 133b, respectively. In addition, according to the present embodiment, when forming the attaching preparation posture (Q) accumulating the elastic repulsive force more than the normal posture (P) by the external force, the insertion portions 143a1 and 143b1 for allowing insertion of the upper ends 153a and 153b and the engagement portions 143a2 and 143b2 to be engaged to the upper ends 153a and 153b due to the elastic repulsive force when the external force is released are provided at the upper attaching portions 143a and 143b.

The attachment structure Z will be specifically described with reference to FIGS. 10 to 15 below. Since the reaction frame portion 15 is made by the reaction force frame elements 151a and 151b formed bilaterally-symmetric, the reaction force frame element 151b will be only described by illustrating in the drawing.

Figure 3:
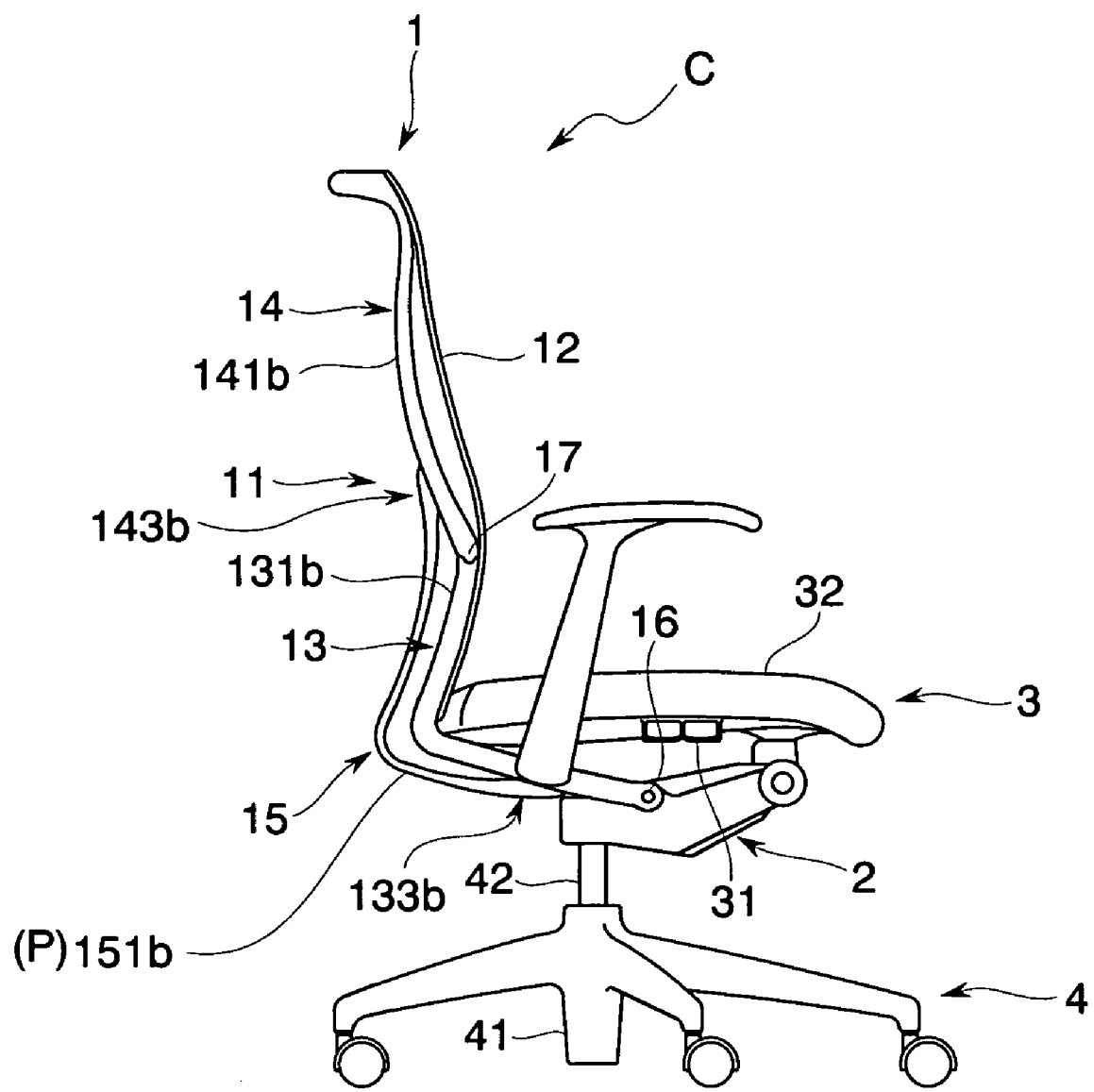
FIG. 3 is a side view of the chair.
Figure 4:
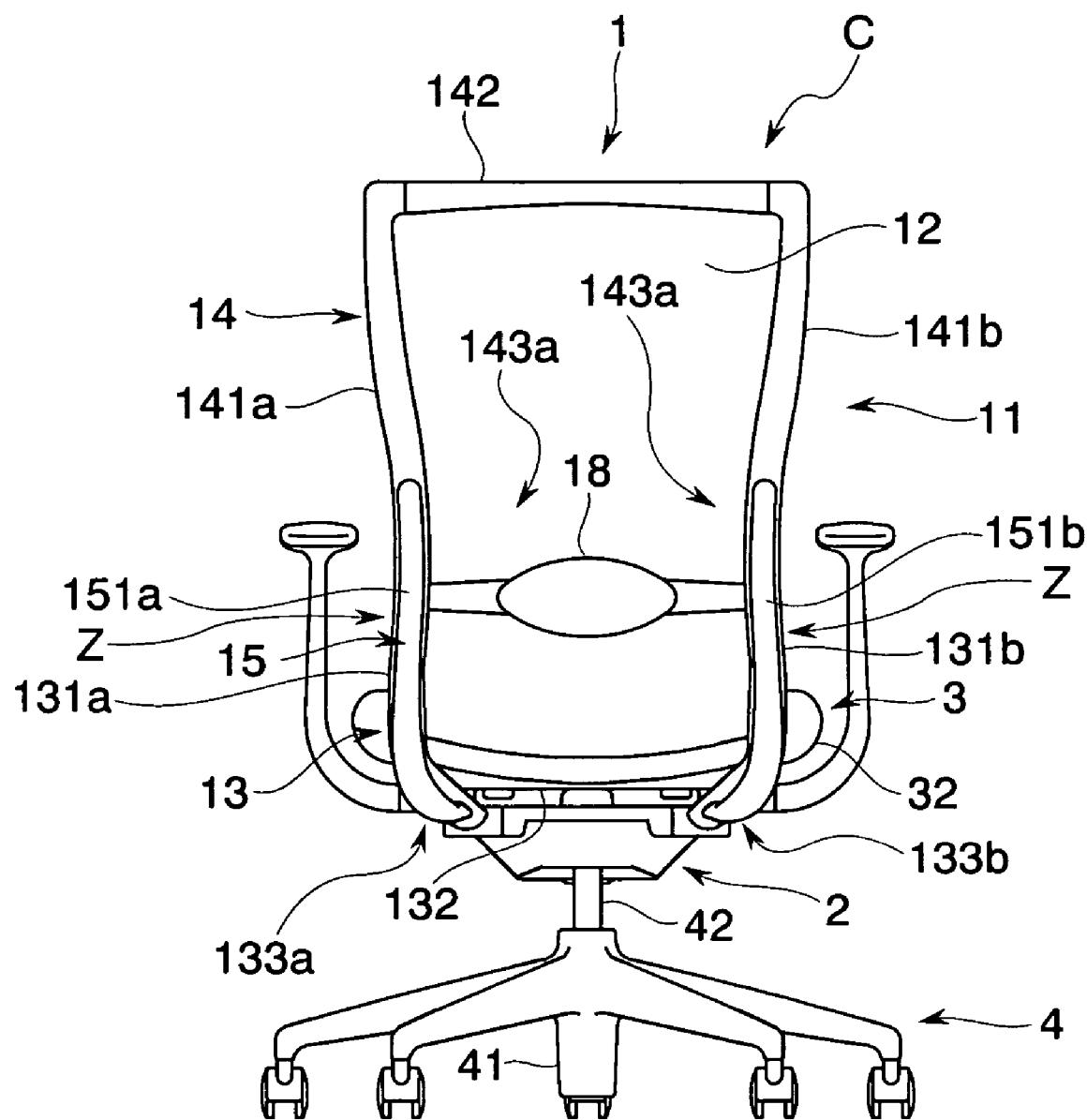
FIG. 4 is a rear view of the chair.
Figure 5:
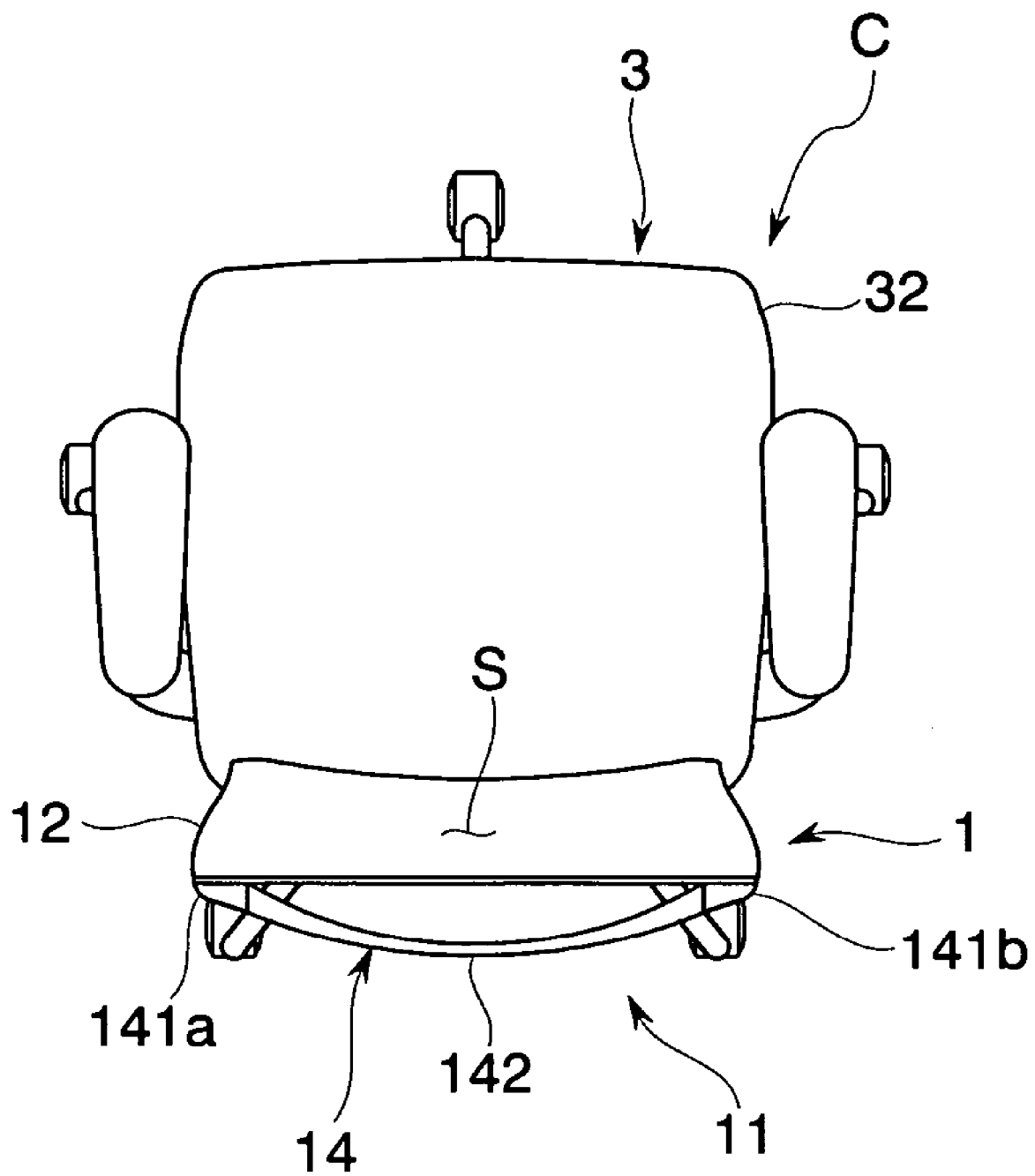
FIG. 5 is a plan view of the chair.
Figure 10:
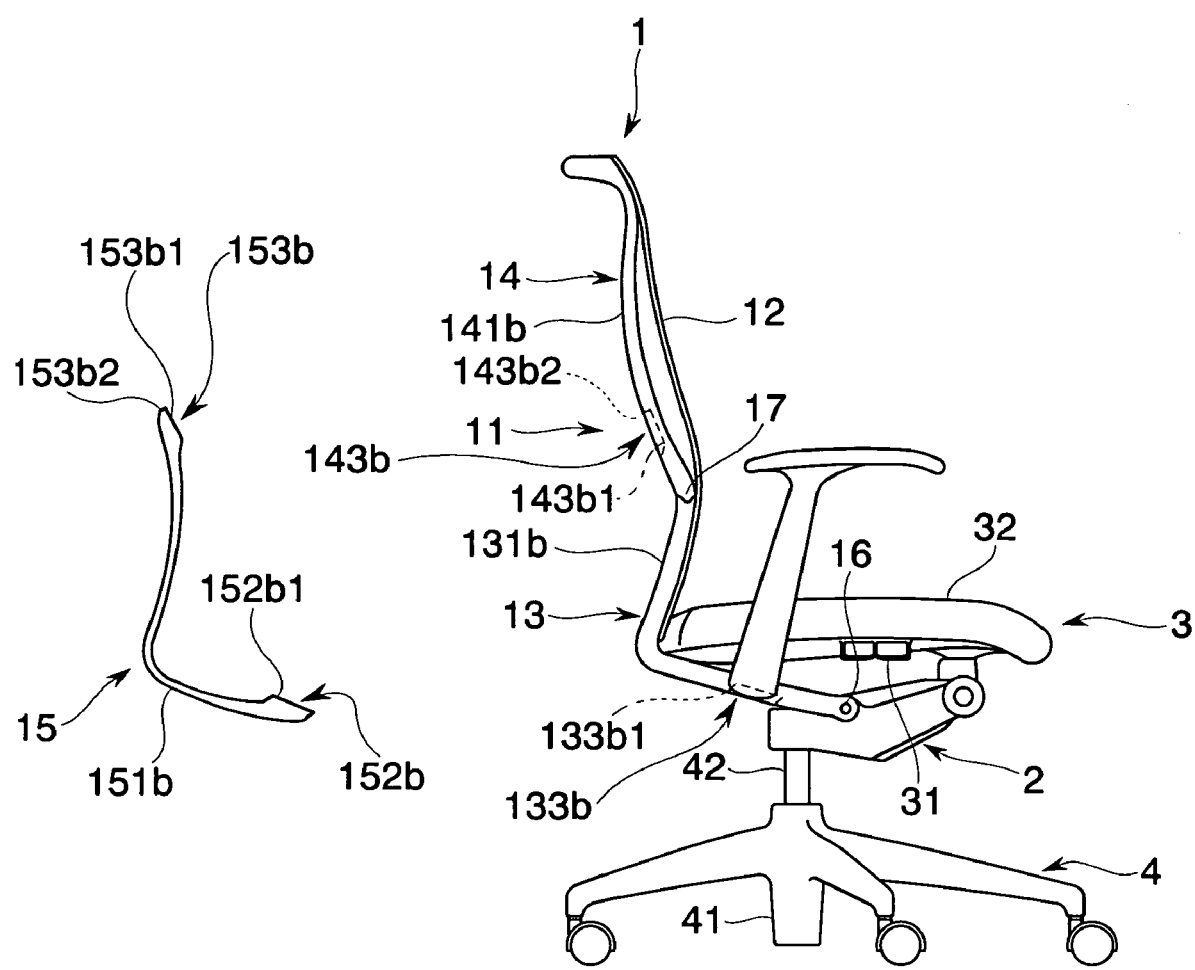
FIG. 10 is a side view showing the synchronous rocking operation of the chair.

As shown in FIG. 10, the reaction force frame element 151b is shaped with the interval between the upper end 153b and the lower end 152b slightly opened than the normal posture (P) shown in FIG. 3 when the reaction force frame element 151b detached from the upper frame element 14 and the lower frame element 13. Therefore, when the reaction force frame element 151b attached to the upper frame element 14 and the lower frame element 13, the pressurization is always given the upper frame element 14. In addition, the upper end 153b and the lower end 152b of the reaction force frame element 151b are mainly made of containing portions 153b1 and 152b1 of the upper end 153b to be fitted in the insertion portions 143b1 and 133b1 to be described later, respectively. Then, the upper side face in the containing portion 153b1 of the upper end portion 153b made into an engagement face 153b2 engaged to the engagement portion 143b2 to be described later. Further, on the upper end 153b and the lower end 152b, the nut hole 144 in which one retaining screw 154 (FIG. 12 and FIG. 13) to be described later is screwed is formed, respectively (the nut hole 155 on the lower end 152b not illustrated). This nut hole 155 is configured, for example, by incorporating a plate nut in a predetermined place of the reaction force frame element 151b.

Figure 11:
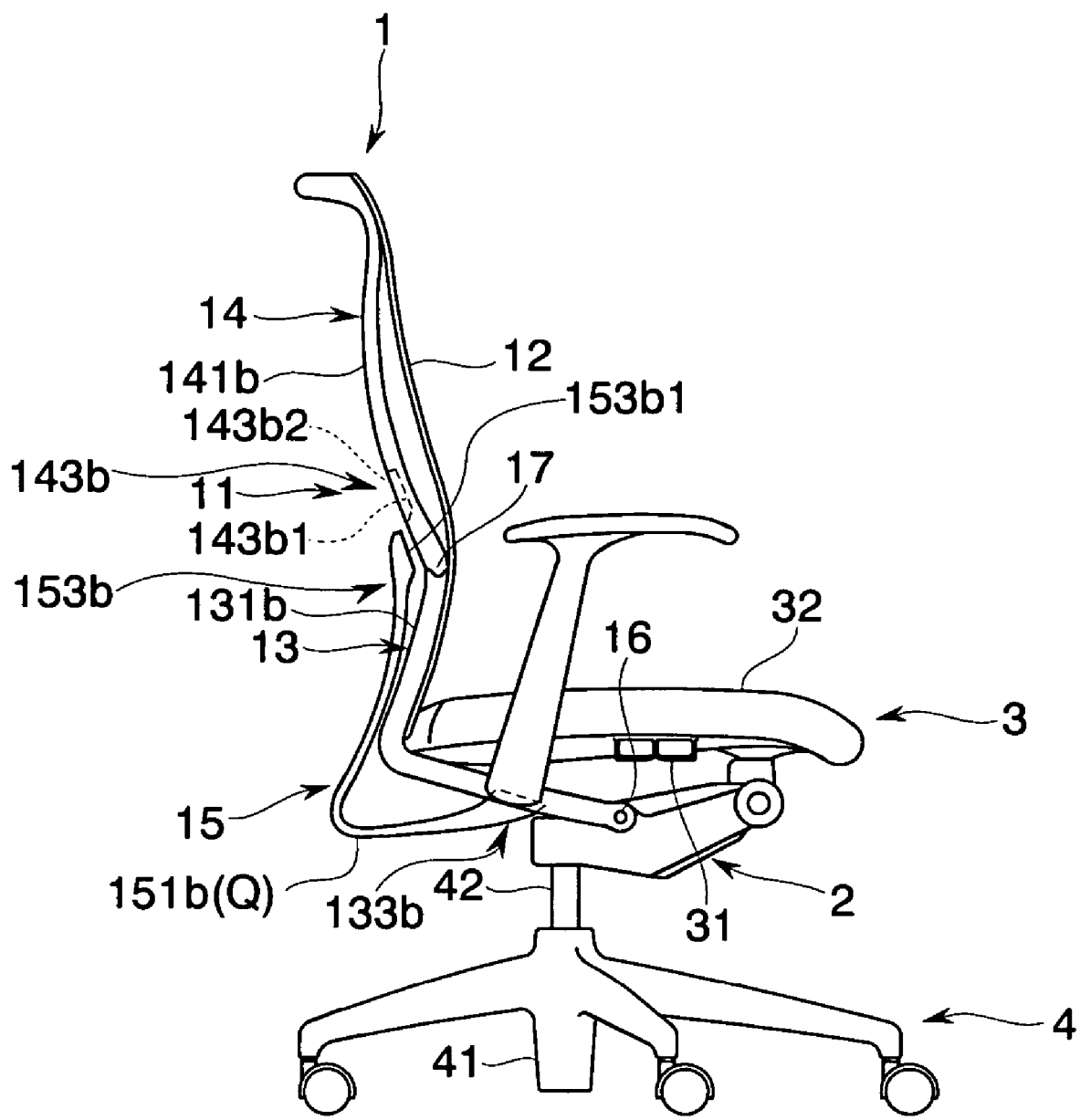
FIG. 11 is a typical side view showing an attachment structure according to the embodiment.

On one hand, at the lower side of the lower frame element, as shown in FIG. 10 and FIG. 11, the lower attaching portion 133b mainly has the insertion portion 133b1 and further, the lower attaching portion 133b has a nut element (not illustrated) in which the retaining screw 154 is screwed.

On the other hand, the upper attaching portion 143b are provided at the rear face side of the upper frame element 141b, as shown in FIGS. 10 to 13 or the like. The upper attaching portion 143b has the insertion portion 143b1 for inserting the upper end 153b1 of the reaction force frame element 151b therein, the engagement portion 143b2 capable of abutting against the engagement face 153b2, and a screw hole 144 for inserting the retaining screw 154 from the front side of the upper frame element 141b (FIG. 12 and FIG. 13).

Then, when attaching the reaction force frame element 151b to the upper frame element 141b and the lower frame element 131b, as shown in FIG. 11, at first, the lower end 152b of the reaction force frame element 151b, namely, the containing portion 152b1 is inserted in the insertion portion 133b1 at the lower attaching portion 133b of the lower frame element 133b, and by fixing the containing portion 152b1 using the retaining screw 154 (not illustrated), the state such that the reaction force frame element 151b attached only to the lower frame element 131b is obtained. Then, by further flexing the reaction force frame element 151b from this state, the attaching preparation posture (Q) as shown in FIG. 11 is configured. Next, by inserting the containing portion 153b1 of the upper end 153b into the insertion portion 143b1 provided to the upper attaching portion 143, the upper end 153b of the reaction force frame element 151b is attached to an upper attaching portion 153.

In this case, in the normal posture (P), the elastic repulsive force of the reaction force frame element 151b acts toward an upper inclined direction to the upper frame element 141b and the engagement portion 143b2 to abut in the upper inclined direction is arranged at the side of the upper attaching portion 143, and this results in that the reaction force frame element 151b held incapable of being detached from the upper frame element 141b. Then, at last, in order to avoid an accidental defect such that the reaction force frame element 151b detached even when the external force in a pulling direction abruptly acts by error to the reaction force frame element 151b, the retaining screw 154 is screwed into the nut hole 155 through the screw hole 144 so as to complete the attachment of the reaction force frame element 151b.

Even in the case that the retaining screw 154 is not used for the upper attaching portion 143b, by separately employing a retaining structure such as a hook portion capable of inhibiting movement into a drawing direction, a so-called attachment-with-no-screw by can be also realized.

Figure 14:
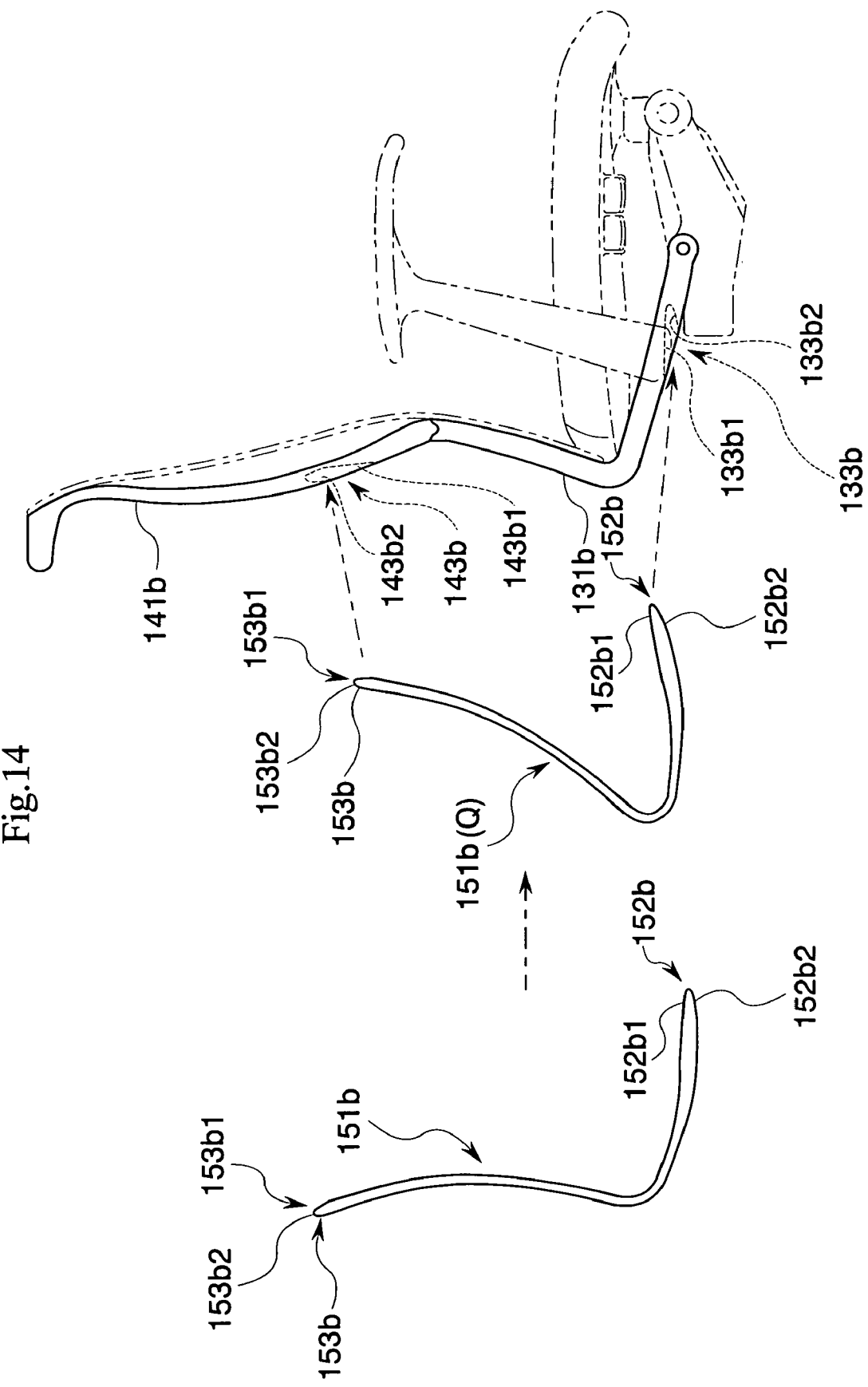
FIG. 14 is a typical side view showing an attachment structure according to a first modified example of the embodiment.
Figure 15:
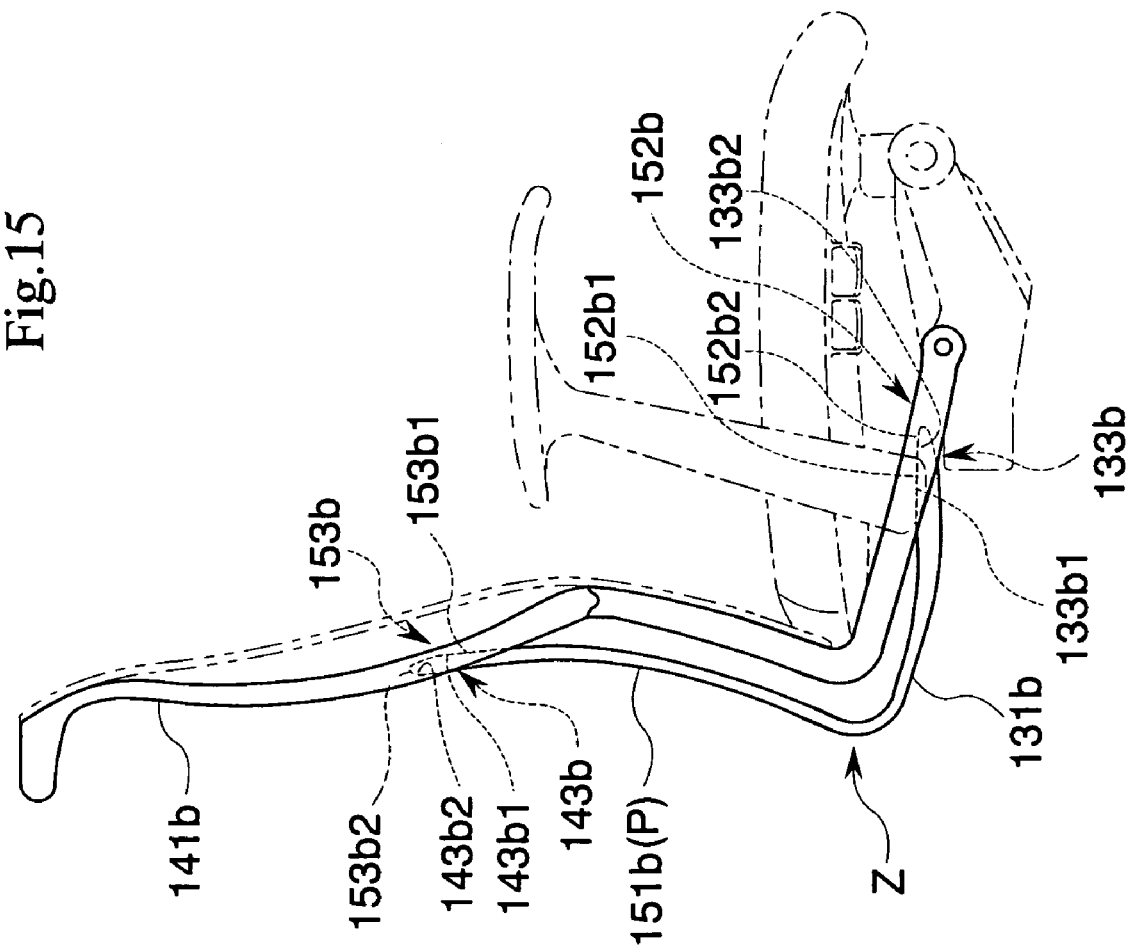
FIG. 15 is a typical side view showing an attachment structure according to the first modified example of the embodiment.

In addition, as shown in FIG. 14, according to a first modified example of the present embodiment, the reaction force frame element 151b can be attached to the attaching portion without the retaining screw 154, namely, by no-screw. In other words, as shown in the drawing as the modified example of the present embodiment, by providing the attaching portions 141b and 131b1 having the insertion portions 141b1 and 131b1 and the engagement portions 141b2 and 131b2 to the upper frame element 141b and the lower frame element 131b, respectively, the upper end 153b and the lower end 152b are inserted in the attaching portions 141b and 131b1, respectively, from the attaching preparation posture (Q) shown in the center of FIG. 14 so as to be able to attach the reaction force frame element 151b to the attaching portion. According to this modified example, the same reference numerals are given to the constitutional elements having the same effects as the above-described embodiment.

As described above, since the attachment structure Z of the reaction force frame elements 151a and 151b which are the frame-like springs according to the present embodiment are provided with insertion portions 153a1 and 153b1 and engagement portions 153a2 and 153b2, the upper ends 153a and 153b are supported to the upper attaching portions 143a and 143b by the elastic urge force as shown in FIG. 13 so as to incapable of falling, so that it is possible to attach the reaction force frame element without the need of a particular member for keeping the attaching positions of the upper ends 153a and 153b. Thereby, the number of parts for attaching the reaction force frame elements 151a and 151b to the attaching portions can be effectively reduced.

Particularly, according to the present embodiment, since this attachment structure Z is employed between the lower frame portion 13 of the chair C which is the first member and the upper frame portion 14 of the chair C which is the second member, not only the attachment structure Z can be elastically urged against the upper frame portion 14 but also the reaction force frame portion 15, namely, the reaction force frame elements 151a and 151b are located along the upper frame portion 14 and the lower frame portion 13. Further, there is provided one retaining screw 154 to prevent the part for attachment from accidentally falling and totally, only four retaining screws 154 are provided right and left. Thus, by effectively reducing the number of parts in the backrest 1 which is exposed to the outside and is highly visible, the chair C is entirely made compact.

Further, the lower frame portion 13 is configured in such a manner that the reaction force frame elements 151a and 151b are provided to a pair of upper frames 141a and 141b, respectively, to be independently supported so as to be capable of being rocked to the upper frame portion 14, respectively. As a result, the reaction force frame elements 151a and 151b can preferably elastically-urge the upper frames 141a and 141b independently right and left.

Although the embodiment of the present invention is described as above, a specific structure of each part is not limited to the above-described embodiment alone and various modifications will be possible without departing from the scope of the present invention.

For example, the attachment structure Z of the frame-like spring according to the present invention is not limited to the aspect to be attached between the lower frame portion 13 and the upper frame portion 14 of the above-described backrest 1 but it is also possible to apply the attachment structure Z like the following second modified example and third modified example. In the following modified examples, the same reference numerals are given to the elements having the same actions as the above-described embodiment and the first modified example and the detailed explanation thereof is herein omitted. Then, with respect to each constitutional element of a reaction frame portion A15 corresponding to the reaction frame portion 15 of the above-described embodiment in the modified example of this embodiment, "A" is given to a capital letter of each constitutional element of the reaction frame portion 15, and the detailed description thereof is herein omitted.

Figure 16:
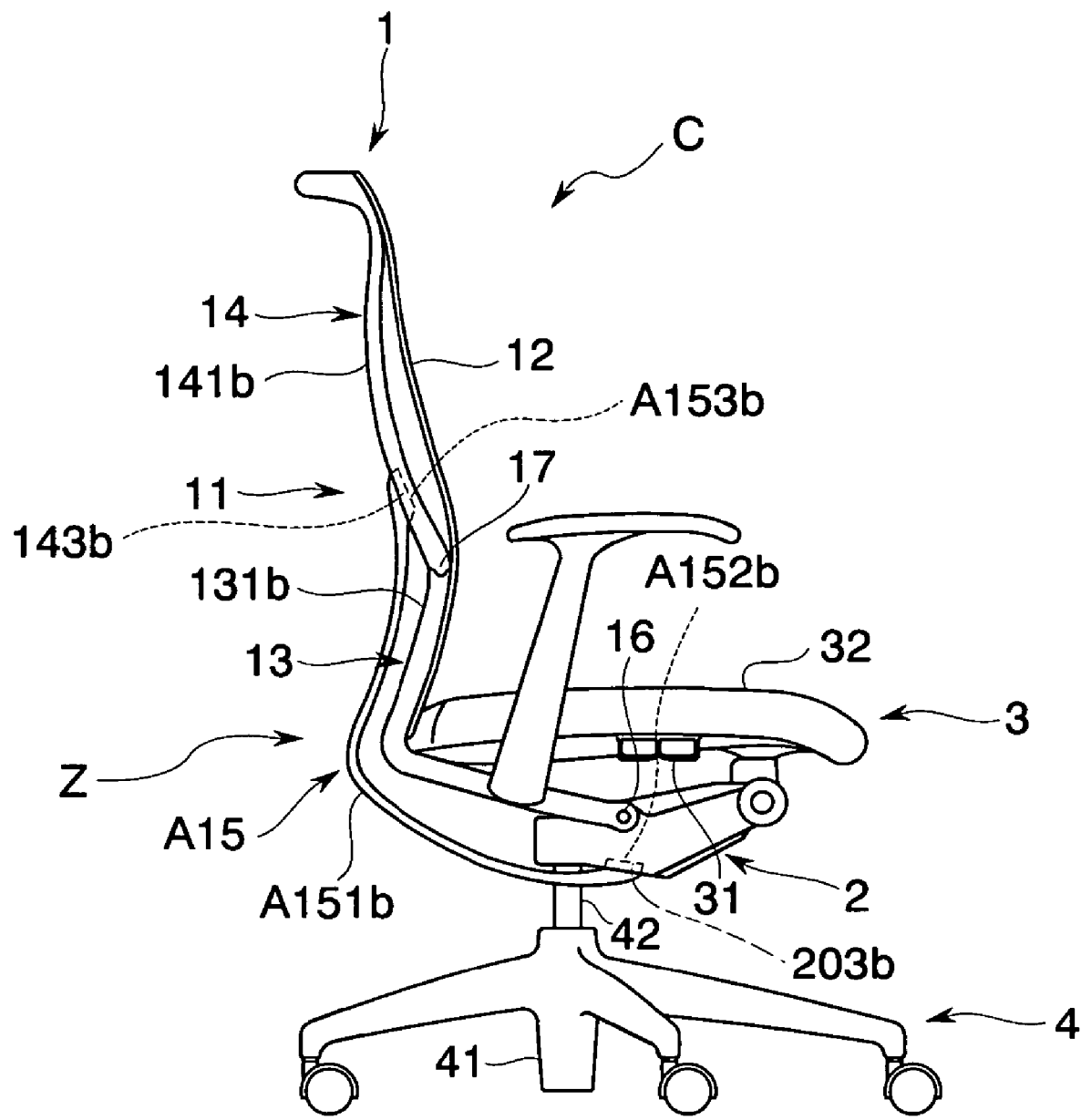
FIG. 16 is a typical side view according to a second modified example of the embodiment.

In other words, as shown in FIG. 16, a reaction force frame element A151b may be installed between a base attaching portion 203b disposed on the base 2 which is the first member and the upper attaching portion 143b disposed on the upper frame element 141b which is the second member. Thus, in the attachment structure Z according to the present embodiment, by making the reaction force frame element A151b into a frame-like spring, the structure to connect the reaction force frame element A151b to the back across the base 2 and the frame element 141b, which are completely separated each other, so as to be able to elastically urge the reaction force frame element A151b realized. According to such a structure, preferably having the structure that deflection of the reaction force frame element A151b becomes larger as the lower frame portion 13 is operated inclining backward, namely, the structure that the elastic urge force against the upper frame element 141b intensified, the upper frame portion 14 strongly elastically-urged by the reaction frame portion A15 can preferably support the back of the user who inclines backward together with the lower frame portion 141b so that the user becomes difficult to move.

Figure 17:
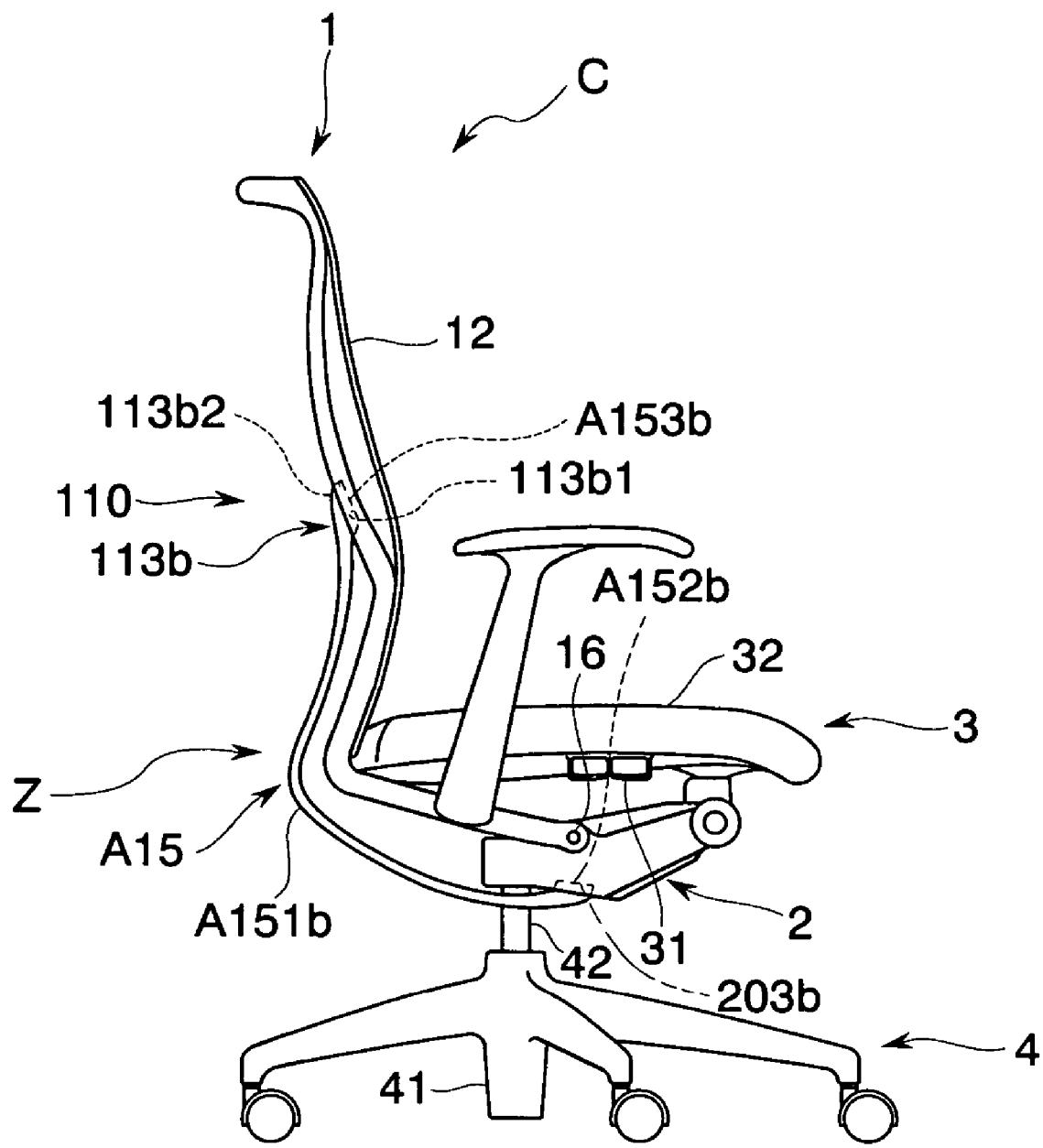
FIG. 17 is a typical side view according to a third modified example of the embodiment.

In addition, as shown in FIG. 17, it is obvious that the reaction frame portion A15 may be applied to the chair C having the base 2 supported by the leg 4 and the back frame 110 of the backrest 1 supported to the base 2 so as to be capable of being rocked to the base 2 in the attachment structure Z according to the present invention.

In other words, as shown in FIG. 17, the attachment structure Z according to the present invention can be preferably applied to the chair C, which is provided with the reaction frame portion A15, namely, the reaction frame portion A151b between the base 2 as the first member and the back frame 110 as the second member. That is to say, the attachment structure Z according to the present invention can be applied to the all chairs supporting the backrest 1 rotatably, namely, so as to be capable of inclining backward not limited to the chair C shown in FIG. 17.

In addition, the reaction frame portion may be provided between the base and the lower frame portion in the chair with the back frame configured by the upper frame portion and the lower frame portion (not illustrated). In such a structure, upon the rocking operation with the lower frame portion, it is preferable that the reaction frame portion can be elastically-urged to the lower frame portion.

Further, the specific structure of each part is not limited to the above described embodiments and various modifications will be possible without departing from the scope of the present invention.

What is claimed is:

1. A structure comprising:
   a first member;
   a second member attached to the first member so said second member is rotatable in a predetermined movable range; and
   an elastic frame element having opposite ends attached via respective attaching portions of said first member and said second member, so that pressurization is provided in the movable range and the pressurization becomes the lowest at a predetermined position, wherein, one of said attaching portions comprises:

an insertion portion allowing insertion of an end of the elastic frame element when the elastic frame element has an attaching preparation posture where elastic repulsive forces are accumulated rather than a normal posture at the predetermined position due to an external force, and an engagement portion to be engaged to the end of the elastic frame element by an elastic repulsive force when the external force is released.

2. The structure according to claim 1, wherein the structure is applied to a chair having a lower frame portion of a backrest which is supported to a base supported by a leg so as to be able to be rocked thereto and an upper frame portion of the backrest which is supported to the lower frame portion so as to be able to be rocked thereto.

3. The structure according to claim 2, wherein the upper frame portion comprises a pair of upper frame elements which are arranged right and left and are independently supported to the lower frame portion, respectively, so as to be able to be rocked thereto; and a resin spring is provided between the lower frame portion and the pair of upper frame elements, respectively.

4. The structure according to claim 1, wherein the structure is applied to a chair having a base supported by a leg, a lower frame portion of a backrest which is supported to the base so as to be able to be rocked thereto, and an upper frame portion of the backrest which is supported to the lower frame portion so as to be able to be rocked thereto.

5. The structure according to claim 1, wherein the structure is applied to a chair having a base supported by a leg and a backrest frame which is supported to the base so as to be able to be rocked thereto.

6. The structure according to claim 1, wherein the first member is metal.

7. The structure according to claim 1, wherein the elastic frame element has essentially an L-shape.

8. The structure according to claim 1, wherein the elastic frame element is resin.

9. An apparatus comprising:

a pair of first members;

a pair of second members rotatably connected to said first member pair, each of said second members being rotatable in a predetermined movable range;

an elastic lateral bridging member connecting said second member pair to each other; and a pair of elastic frame elements each having opposite ends attached via respective attaching portions to said first member pair and said second member pair, said elastic frame elements providing pressurization to said first member pair and said second member pair with said pressurization being lowest at a normal posture, wherein said elastic lateral bridging member is deformed when one of said pair of second members is relatively moved backward.

* * * * *